United States Patent [19]

Inada et al.

[11] Patent Number: 4,912,974
[45] Date of Patent: Apr. 3, 1990

[54] THERMAL FLOW SENSOR

[75] Inventors: Masanori Inada; Hichiro Ohtani; Tomoya Yamakawa, all of Himeji, Japan

[73] Assignee: Mitsubishi Denki Kabushiki Kaisha, Tokyo, Japan

[21] Appl. No.: 280,921

[22] Filed: Dec. 7, 1988

[30] Foreign Application Priority Data

Dec. 8, 1987 [JP] Japan .................... 62-311387
Dec. 26, 1987 [JP] Japan .................... 62-197813

[51] Int. Cl.$^4$ ............................................. G01F 1/68
[52] U.S. Cl. ................................................. 73/204.25
[58] Field of Search ............ 73/204.15, 204.16, 204.23, 73/204.25, 204.26, 204.27

[56] References Cited

U.S. PATENT DOCUMENTS

| | | | |
|---|---|---|---|
| 4,373,387 | 2/1983 | Nishmura et al. | 73/204.27 |
| 4,393,697 | 7/1983 | Sato et al. | 73/204.27 |
| 4,425,792 | 1/1984 | Kohama et al. | 73/204.27 |
| 4,498,337 | 2/1985 | Gruner | 73/204.26 |
| 4,513,615 | 4/1985 | Sato et al. | 73/204.25 |
| 4,677,850 | 7/1987 | Miura et al. | 73/204.15 |
| 4,682,496 | 7/1987 | Miura et al. | 73/204.16 |

FOREIGN PATENT DOCUMENTS

| | | | |
|---|---|---|---|
| 108930 | 7/1986 | Japan . | |
| 186819 | 8/1986 | Japan . | |
| 0194317 | 8/1986 | Japan | 73/204.26 |
| 98219 | 5/1987 | Japan . | |
| 111519 | 7/1987 | Japan . | |

*Primary Examiner*—Herbert Goldstein
*Attorney, Agent, or Firm*—Sughrue, Mion, Zinn, Macpeak & Seas

[57] ABSTRACT

A thermal flow sensor has a housing through the inside of which a fluid is allowed to flow, and a supporting substrate disposed within and substantially in the center of the housing. A flat-plate shaped thermosensitive resistor and a fluid temperature sensor are provided on the supporting substrate. The thermosensitive resistor is disposed on the supporting substrate by being supported by a plurality of slender supporting members which support end portions of the resistor in such a manner as to provide narrow portions of a heat transferring path. The sensor detects flow rate with a good sensibility, while preventing any reduction in high levels of measuring sensibility and responsibility that are possessed by a small thermosensitive resistor.

2 Claims, 2 Drawing Sheets

THERMAL FLOW SENSOR

BACKGROUND OF THE INVENTION

1. Field of the Invention

The present invention relates to a thermal flow sensor which employs a thermosensitive resistor (heating resistor) to detect the flow rate of fluids such as gases.

2. Description of the Related Art

A flow sensor of a certain type is known which detects the flow rate of a fluid from a balanced state of a bridge circuit including a thermosensitive resistor disposed in the fluid. An example of such a flow sensor is disclosed in Japanese Utility Model Laid-Open No. 61-108930. Explanations will be given below, with reference to FIGS. 1 and 2, concerning a known thermal air-flow sensor having a thermosensitive resistor which serves as a heating resistor and in which platinum-film resistor elements are formed on a ceramic substrate.

The overall arrangement of the known thermal flow sensor will be described with reference to FIG. 1. As shown in FIG. 1, the sensor has a housing 1 defining the main passage for a fluid, a supporting substrate 2 which is provided at a predetermined position within the housing 1 and which comprises, for instance, a pipe defining a measurement passage, a thermosensitive resistor 3 provided on the supporting substrate 2 for converting a change in its temperature caused by the fluid into a corresponding change in its resistance, and an air temperature sensor 4 also provided on the supporting substrate 2 for detecting the air temperature and thus enabling the correction of any variation in the change in temperature of the fluid. The thermosensitive resistor 3 and the air temperature sensor 4 form a bridge circuit, together with resistors $R_1$ and $R_2$.

The bridge circuit has junctions b and f connected to the input terminals of a differential amplifier 101 the output terminal of which is connected to the base of a transistor 102. The emitter of the transistor 102 is connected to one terminal a of the bridge circuit, and its collector is connected to the anode of a DC power source 103. The transistor 102 and the differential amplifier 101 form a control circuit which controls the current supplied to the thermosensitive resistor 3, thereby maintaining the bridge circuit in a balanced state.

Referring to FIG. 2, there is shown a conventional structure for supporting the thermosensitive resistor 3. As shown in FIG. 2, the thermosensitive resistor 3 is supported by the upper portions of a pair of supporting members 5 disposed on the supporting substrate 2. The supporting members 5 comprise an electrical conductor and also serve as electrically connecting leads. The resistor 3 is supported in such a manner that its upper and lower surfaces align with a direction A in which the fluid flows. The electric connection between the thermosensitive resistor 3 and the supporting members 5 is established at engaging portions 6, one of which is hatched in the figure.

With the above-described conventional air-flow sensor, flow rate is detected in the following manner. Before a fluid is allowed to flow, a certain voltage is applied to the bridge circuit to cause the thermosensitive resistor 3 to generate heat. When the fluid, i.e. air, comes into contact with the resistor 3, the temperature of the resistor 3 drops, thereby causing a change in the resistance of the resistor 3. A current $I_H$ increased by an amount corresponding to the change in the resistance of the resistor 3, i.e. to the flow rate of the fluid, is caused to flow through the resistor $R_1$, thereby bringing the bridge circuit into a balanced state. In this balanced state, the voltages at the junctions b and f are equal. On the basis of the current $I_H$, the voltage $V_O = I_H \times R_1$ at the junction b is extracted as the flow rate of the fluid from a signal outputting portion S. A signal from the signal outputting portion S is fed to a signal processing section, not shown, then processed therein, so as to determine the flow rate of the fluid. Because changes in air temperature cause variations in the change in resistance of the resistor 3, the variations are corrected by the use of the air temperature sensor 4.

In recent years, a know thermal flow sensor such as that described above incorporates, as the thermosensitive resistor 3, a small thermal resistor (e.g., a resistor having a length of about 2 mm, a width of about 0.5 mm and a thickness of about 0.1 mm) which processes a small thermal capacity and a high responsibility, in order to effect detection with a higher ability to follow up with changes in the flow rate of the fluid to be measured. However, if such a thermal resistor is mounted using the known supporting structure shown in FIG. 2, the thermal capacity of the supporting members 5 may be greater than that of the thermosensitive resistor 3, leading to the risk that the measuring sensitivity and the measuring responsibility may be degraded.

In addition, since the mechanical strength of the thermosensitive resistor 3 inevitably drops, the resistor 3 may become broken during mounting onto the structure shown in FIG. 2.

SUMMARY OF THE INVENTION

The present invention has been accomplished in order to eliminate the above-stated problems. It is an object of the present invention to provide a thermal flow sensor which is capable of preventing any reduction in high levels of measuring sensibility and responsibility that are possessed by a small thermosensitive resistor, and of effecting the highly-sensitive detection and the quick measurement of flow rate.

According to the present invention, there is provided a thermal flow sensor which comprises: supporting means; a plurality of slender supporting members provided on the supporting means, the tip portions of the supporting members supporting a thermosensitive resistor in such a manner as to provide narrow portions of a heat transferring path, the thermosensitive resistor being disposed on the supporting means by being supported at end portions thereof by the supporting members; a fluid temperature sensor provided on the supporting means; a bridge circuit including the thermosensitive resistor, the fluid temperature sensor, and a plurality of resistors; a control circuit for maintaining a balanced state of the bridge circuit; and a signal outputting portion for outputting a flow rate signal which is obtained from the bridge circuit when the circuit is in a balanced state.

DESCRIPTION OF THE PREFERRED EMBODIMENTS

Figure 1:
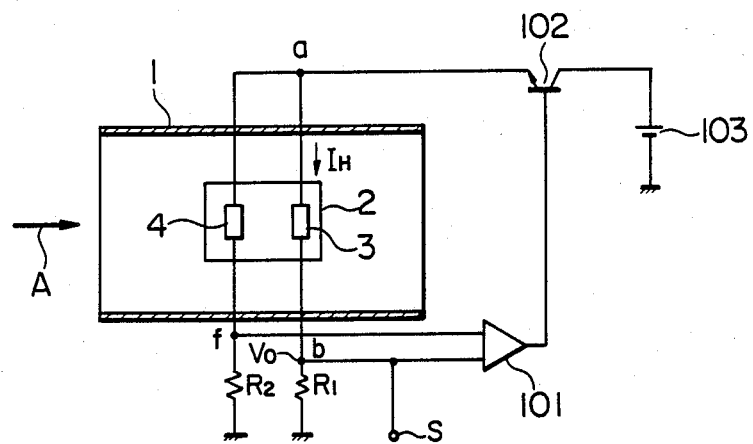
FIG. 1 is a schematic illustration showing the arrangement of a thermal flow sensor.
Figure 3:
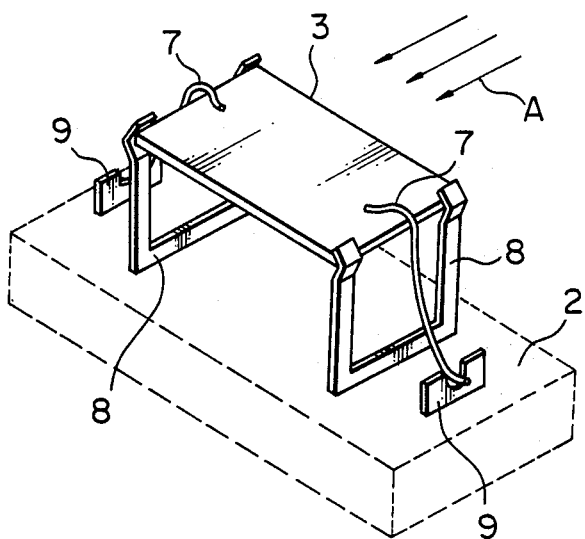
FIG. 3 is a perspective view showing a thermosensitive resistor of a thermal flow sensor in accordance with one embodiment of the present invention.

Certain embodiments of the present invention will be described hereunder in detail with reference to the drawings. The arrangement of a thermal flow sensor, such as a thermal air-flow sensor, in accordance with one embodiment of the present invention will be described with reference to FIG. 1. As shown in FIG. 1, the flow sensor has a housing 1 through which a fluid, e.g. air, a gas, is allowed to flow, a supporting means, such as a supporting pipe passage 2 or a measurement pipe passage, which is disposed at a predetermined position within the housing 1, a thermosensitive resistor 3 and an air temperature sensor 4 which are provided on the supporting pipe passage 2. As shown in FIG. 3, the thermosensitive resistor 3 is fixed to the supporting pipe passage 2, which is formed of an insulating material, by means of slender, U-shaped supporting members 8. More specifically, four corner portions of the thermosensitive resistor 3 are held by the tip portions of a pair of supporting members 8 which thus provide narrow portions of a heat transferring path, and they are fixed to the supporting pipe passage 2 in such a manner that the thermosensitive resistor 3 is parallel with a direction A in which the fluid flows. A pair of terminals 9 are provided in opposing relationship on the outside of the supporting members 8. The thermosensitive resistor 3 and the terminals 9 are connected through leads 7 for electric conduction. The thermosensitive resistor 3, the air temperature sensor 4, and resistors $R_1$ and $R_2$ form a bridge circuit, as shown in FIG. 1.

The electric circuit of the thermal air-flow sensor having the above-described construction operates in basically the same manner as that of the conventional thermal flow sensor. That is, a control circuit adjusts the voltage in such a manner that the bridge circuit including the thermosensitive resistor 3 and the air temperature sensor 4 is maintained in an electrically balanced state wherein the voltages at junctions b and f are equal. At this time, a current corresponding to the flow rate of the fluid flows through the thermosensitive resistor 3, and the voltage $V_O$ at the junction b is output as a flow rate signal from a signal outputting portions S to be fed to a signal processing section, not shown, which then calculates the flow rate of the fluid.

As has been described above, since the supporting members 8 are slender and support only the corner portions of the thermosensitive resistor 3, the area of contact between the members 8 and the resistor 3 is small. This structure enables a reduction in the thermal capacity of the supporting members 8, and also a reduction in the amount of heat transferring from the thermosensitive resistor 3 to the supporting members 8. Consequently, it is possible to control the bridge circuit to achieve its balanced state accurately and quickly in response to a change in the thermosensitive resistor 3, and, hence, it is possible to enhance the detection sensitivity and detection responsibility of the flow rate sensor. Although the supporting members 8 are slender and U-shaped, this does not cause any deterioration in mechanical strength. It is preferred that the supporting members 8 should be formed of an insulating material having a small thermal conductivity, however, they may be alternatively formed of a metalic material.

Figure 4:
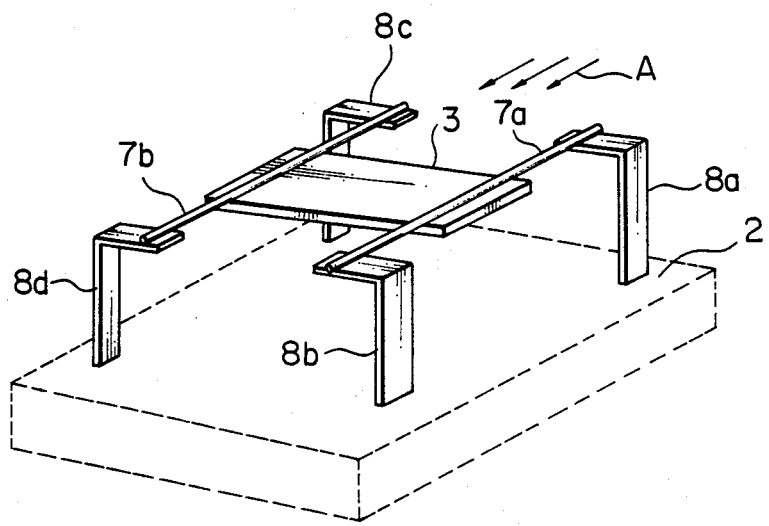
FIG. 4 is a perspective view showing a thermosensitive resistor of a thermal flow sensor in accordance with another embodiment of the present invention.

FIG. 4 is a perspective view of a thermosensitive resistor 3 of a sensor in accordance with another embodiment of the present invention. In FIG. 4, parts which are the same as those shown in FIGS. 1 and 3 are denoted by the same reference numerals. Referring to FIG. 4, end portions of a flat-plate shaped thermosensitive resistor 3 are connected with leads 7a and 7b which also serve as leads for electrical connection. Both ends of each lead 7a or 7b project from the ends of the thermosensitive resistor 3 to be connected to slender supporting members 8a and 8b, or 8c and 8d.

Each of the supporting members 8a, 8b and 8c, 8d are disposed in such a manner that they form a pair in the longitudinal direction of the lead 7a or 7b. In this way, the supporting members 8a to 8d are supported on the supporting substrate 2 at predetermined positions with respect to a direction A in which the fluid flows.

The supporting members 8a to 8d also serve as electrically connecting leads, and form a bridge circuit, such as that shown in FIG. 1, together with the thermosensitive resistor 3, resistors $R_1$ and $R_2$, and an air temperature sensor 4.

With the above-described construction, since the end portions of the thermosensitive resistors 3 are supported by supporting force that acts in the longitudinal direction of the leads 7a and 7b, the resistor 3 is held at a predetermined position with respect to the direction A in which the fluid flows, while the resistor 3 is kept from being influenced by the fluid flow.

At the portions where the thermosensitive resistor 3 is connected with the leads 7a and 7b, since the only cause of the tensile force incurred by supporting the resistor 3 is the weight of the thermosensitive resistor 3 itself, there is no risk of disconnection occurring at the connecting portions.

Figure 2:
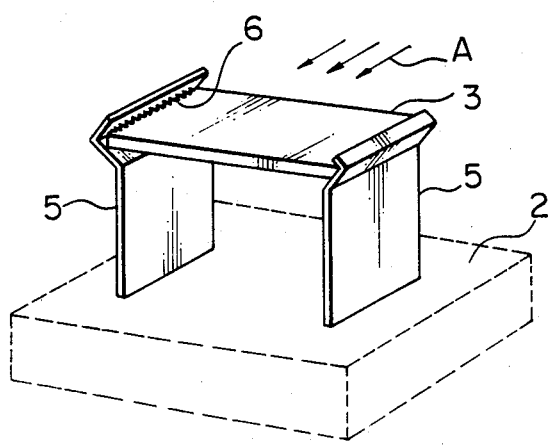
FIG. 2 is a perspective view showing the structure for supporting a thermosensitive resistor of a conventional thermal flow sensor.

Further, with the structure shown in FIG. 4, since the thermosensitive resistor 3 receives no direct supporting force from the supporting members, in contrast with the known supporting structure shown in FIG. 2 that employs supporting members 5, there is no risk of the resistor 3 becoming broken.

As has been described above, since the thermosensitive resistor is disposed at a predetermined position in the direction of fluid flow by means of leads having a small thermal capacity, the thermosensitive resistor contributes to the enhancement of detection sensitivity and responsivility, while making it possible to minimize any external mechanical forces which may act on the resistor.

What is claimed is:

1. A thermal flow sensor comprising:
   a flat plate-shaped thermosensitive resistor;
   means for supporting said thermosensitive resistor upon a supporting substrate in a flow path of a fluid, said supporting means comprising a pair of U-shaped members, each of said U-shaped members having a pair of slender legs supporting said thermosensitive resistor at ends thereof and a base portion fixed to said supporting substrate, said ends of said legs having a width much less than a length of the sides of said thermosensitive resistor;
   a fluid temperature sensor provided on said supporting means;

- a bridge circuit including said thermosensitive resistor, said fluid temperature sensor, and a plurality of resistors;
- a pair of slender leads connecting said thermosensitive resistor to said bridge circuit;
- a control circuit for maintaining a balanced state of said bridge circuit; and
- a signal outputting portion for outputting a flow rate signal which is obtained from said bridge circuit when said bridge circuit is in a balanced state.

2. A thermal flow sensor comprising:
- a flat plate-shaped thermosensitive resistor;
- means for supporting said thermosensitive resistor upon a supporting substrate in a flow path of a fluid, said supporting means comprising a pair of slender leads extending along edge portions of said thermosensitive resistor and four slender supporting members having an inverted L-shape, one end of each of said supporting members being fixed to said substrate and the other end of each of said supporting members supporting a respective end of one of said leads, said leads having a diameter much less than a length of the edges of said thermosensitive resistor;
- a fluid temperature sensor provided on said supporting means;
- a bridge circuit including said thermosensitive resistor, said fluid temperature sensor, and a plurality of resistors, said thermosensitive resistor being connected to said bridge circuit through said slender leads and said supporting members;
- a control circuit for maintaining a balanced state of said bridge circuit; and
- a signal outputting portion for outputting a flow rate signal which is obtained from said bridge circuit when said bridge circuit is in a balanced state.

* * * * *